United States Patent [19]

Falcoff et al.

[11] Patent Number: 5,278,736
[45] Date of Patent: Jan. 11, 1994

[54] AUTOMOBILE SUN VISOR VANITY MIRROR MODULE

[75] Inventors: Monte L. Falcoff, Southfield; George Boguszewicz, Westland, both of Mich.; John Swiatocha, Longmeadow, Mass.; Leonard E. Moriconi, Southfield, Mich.

[73] Assignee: United Technologies Automotive, Inc., Dearborn, Mich.

[21] Appl. No.: 839,423

[22] Filed: Feb. 21, 1992

[51] Int. Cl.⁵ .............................. F21V 33/00
[52] U.S. Cl. .................... 362/141; 362/144; 296/97.5; 338/176
[58] Field of Search .......... 362/135, 137, 140-144, 61, 66; 338/176, 194, 333, 202; 296/97.1, 97.5

[56] References Cited

U.S. PATENT DOCUMENTS

| | | | |
|---|---|---|---|
| 2,165,199 | 7/1939 | Batcheller | 201/53 |
| 2,179,686 | 11/1939 | Cohen | 201/55 |
| 2,282,494 | 5/1942 | Potter | 88/20 |
| 2,846,551 | 8/1958 | Linder et al. | 201/48 |
| 2,879,379 | 3/1959 | Lyons | 240/4.2 |
| 2,922,976 | 1/1960 | Bourns | 338/176 |
| 2,999,148 | 9/1961 | Kay | 240/2.1 |
| 3,277,784 | 10/1966 | Hudson | 88/57 |
| 3,794,828 | 2/1974 | Arpino | 240/4.2 |
| 3,900,818 | 8/1975 | Berkelhamer et al. | 338/176 |
| 4,075,468 | 2/1978 | Marcus | 362/144 |
| 4,238,755 | 12/1980 | Knauff | 338/176 |
| 4,363,085 | 12/1982 | Demas | 362/283 |
| 4,794,497 | 12/1988 | Ionsas et al. | 362/143 |
| 4,879,637 | 11/1989 | Clark et al. | 362/141 |
| 4,939,383 | 7/1990 | Tucker et al. | 307/139 |
| 4,947,054 | 8/1990 | Flowers et al. | 307/125 |

Primary Examiner—James C. Yeung
Attorney, Agent, or Firm—John Swiatocha

[57] ABSTRACT

Electric circuity (45) in a lighted vanity mirror module (5) for an automobile sun visor (40) is mounted on the backside of an appearance bezel (10), thereby obviating the necessity for a separate housing. A wire wound resistor (80) is employed in a lamp dimmer (37) and, with the bezel, retains a sliding contact which controls lamp intensity.

13 Claims, 5 Drawing Sheets

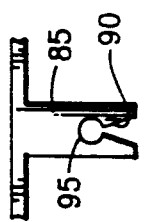
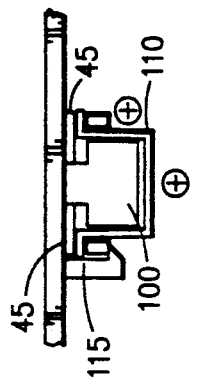
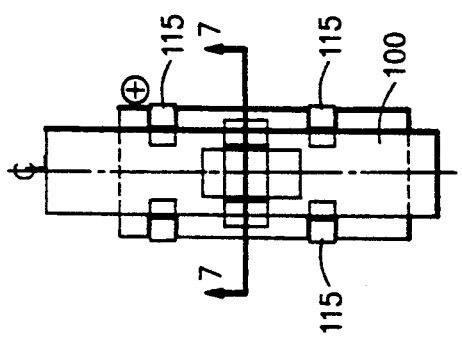
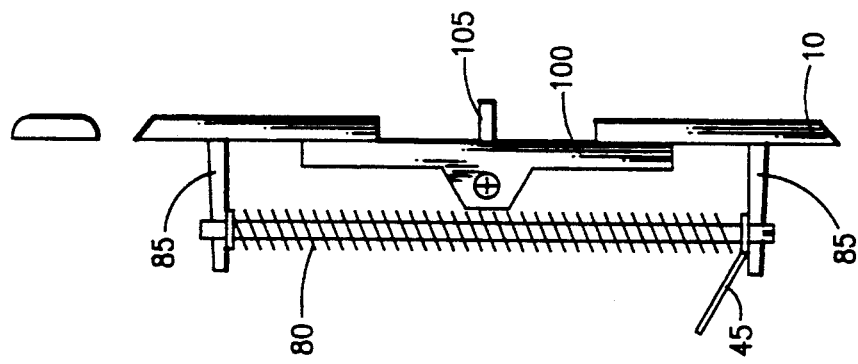
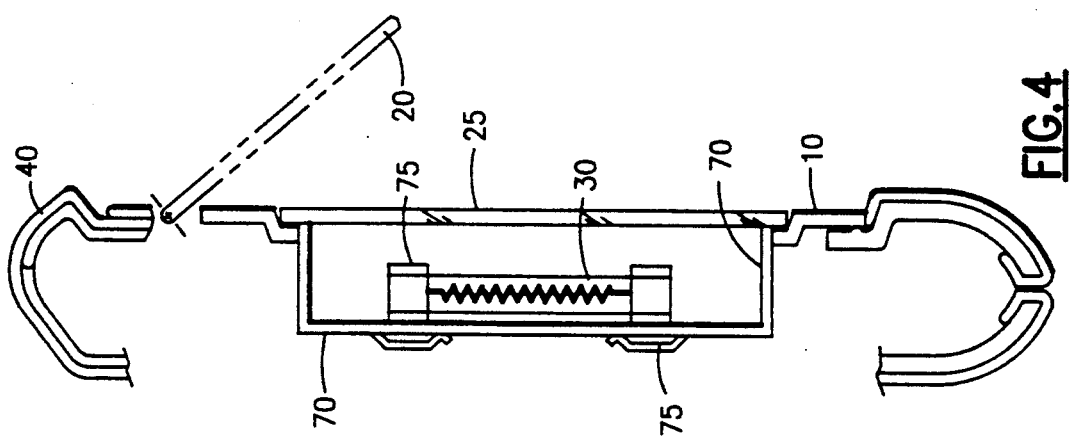

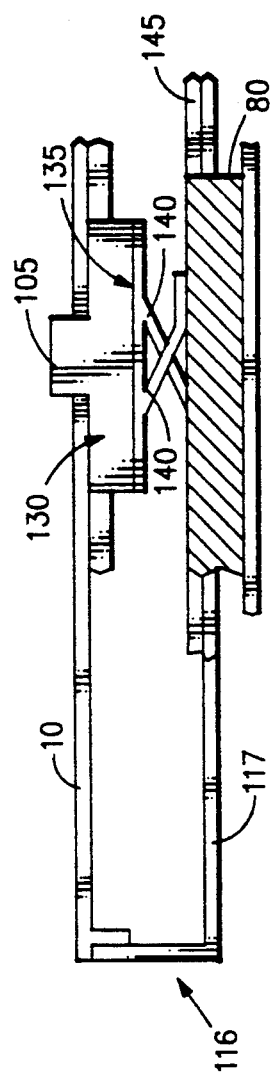
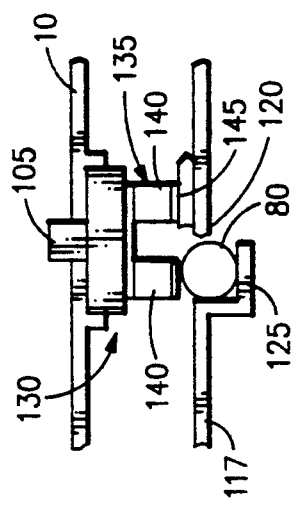

AUTOMOBILE SUN VISOR VANITY MIRROR MODULE

TECNICAL FIELD

This invention relates to lighted vanity mirror modules of the type employed on automobile sun visors, and particularly, to such modules characterized by enhanced simplicity and economy of construction.

BACKGROUND ART

Vanity mirrors which mount to sun visors have long been a popular accessory in passenger automobiles. Typically, the mirror is mounted on the upper surface of the sun visor, so that when the sun visor is swung downwardly to a sun shading position, the mirror is aligned with the face of the driver or passenger for uses such as personal grooming and the like. Certain of such vanity mirrors have been provided in packages with electric lighting which illuminates the users face for night time operation or to approximate ambient light conditions to be encountered by the user at his or her destination. One known type of lighted vanity mirror includes a pair of electric lamps disposed at opposite ends of the mirror and a pivotable cover for covering the mirror and lights when not in use. Circuitry for connection of the lights to the automobile's electrical system, including an on/off switch and often times a dimming control, is also provided in the module.

It has been found that such lighted vanity mirror modules can be improved upon in a number of respects. One potential area of improvement lies in the packaging of the electrical circuitry employed in the module. Traditionally, most illuminated vanity mirror modules comprise a shallow housing covered by an appearance bezel which usually supports the mirror, lid, and lenses for the electric lamps and the mirror. The electrical circuitry consisting of an on/off switch in some cases a dimming control, a pair of bulbs, and electrical conductors comprising metallic stampings or wires including the bulbs, switch and dimmer, are disposed in the housing beneath the bezel. Where the circuit conductors comprise metallic stampings, such stampings are often heat staked to, or molded within a base plate of the housing.

Such constructions are disadvantageous in a number of respects. For example, the housing and bezel tend to be heavy and bulky, thereby adding significantly to the weight and bulk of the visor on which they are attached. This renders the visor cumbersome to operate and dimensionally, quite thick thereby reducing passenger head room in the automobile. Molding the metallic stampings into the housing base plate when the base plate, adds significantly to the cost of molding the housing and risks unacceptable warpage of the base plate during manufacture.

In an effort to reduce the bulk and weight of the lighted mirror module, it is sometimes the practice to mount the electrical circuit components directly to a molded sun visor blade. While this construction eliminates the need for a housing and base plate, it limits the type of visors to which the module is adaptable and, therefore, may not be useful with the padded and upholstered visors found in current luxury automobiles. Moreover, if the lighted mirror module requires service, the entire visor must be serviced since that the module is an integral part of the visor and is not conveniently removable therefrom for servicing.

Another area of improvement in current lighted vanity mirror modules lies in the construction of the dimming control. Certain mirror modules employ resistors connected along the length thereof to a plurality of contacts formed into a metallic stamping and a movable wiper contact which rides along the contacts to adjust the amount of resistance in the lamp circuit and thus control the lamp intensity. Such a construction is found in U.S. patent application Ser. No. 07/357,652. While such a construction has proven to be effective and reliable, the metallic stamping employed into which the resistor contacts are employed, is rather complex in shape, somewhat costly, and therefore not as economical as may be desired. Other lighted mirror modules such as that disclosed in U.S. Pat. No. 4,879,637 employ specialized resistors comprising resistive coatings on a circuit board. However, such resistors can be prohibitively expensive and may require multiple contacts similar to those discussed hereinabove and, therefore, are also characterized by some significant cost and complexity.

Accordingly, a lighted vanity mirror module characterized by enhanced compactness, simplicity of construction and economy of manufacture is highly desirable.

DISCLOSURE OF INVENTION

In accordance with one aspect of the present invention, the electric circuitry in a lighted vanity mirror module with a dimmer is mounted entirely on the backside of an appearance bezel, obviating the necessity (and the attendant bulk and weight) of a separate housing to support and house the circuitry. The dimming of the electric lamps is provided by an ordinary wire wound resistor having a contact slidable thereover and captured between the resistor and the appearance bezel of the module. This arrangement provides effective dimming of the lamps yet requires no costly specialized resistors or complex multiple contacts in a circuit stamping and is, therefore, simple in construction and economical to manufacture. The wire wound resistor and the associated bulbs may be conveniently mounted on clips (sockets) which are snap-fit or formed integrally on the inner surface of the bezel. In the preferred embodiment, the wire wound resistor is mounted by an interference (snap) fit on clips molded into the backside of the bezel while the bulbs are mounted on electrically conductive clips (sockets) snap-fit in openings provided in the bezel. The bezel may be slotted and the slidable contact provided with a button extending through such slot, by which the contact may be conveniently manipulated by a user. Where size, cost and weight constraints are not as critical, and a full housing for the lighted mirror module is desired, the wire wound resistor may be conveniently mounted to a base plate of the housing by an interference fit with a clip molded into the base plate, the sliding contact being retained between the wire wound resistor and the bezel as described hereinabove.

BRIEF DESCRIPTION OF THE DRAWINGS

FIG. 4 is a sectional view of the module taken in the direction of line 4—4 of FIG. 1;

FIG. 5 is a sectional view of a dimming control employed in the module, taken in the direction of line 5—5 of FIG. 1;

FIG. 6 is a bottom, plan view of the sliding contact illustrated in FIG. 5;

FIG. 7 is a sectional view taken in the direction of line 7—7 of FIG. 6;

FIG. 8 is an elevation of a clip on which a variable resistor employed in the dimming control illustrated in FIG. 5 is mounted;

FIG. 9 is a fragmentary, partially sectioned elevation of an alternate embodiment of the dimmer employed in the module; and FIG. 10 is a partially sectioned, end elevation of the dimmer illustrated in FIG. 9.

BEST MODE FOR CARRYING OUT THE INVENTION

Figure 1:
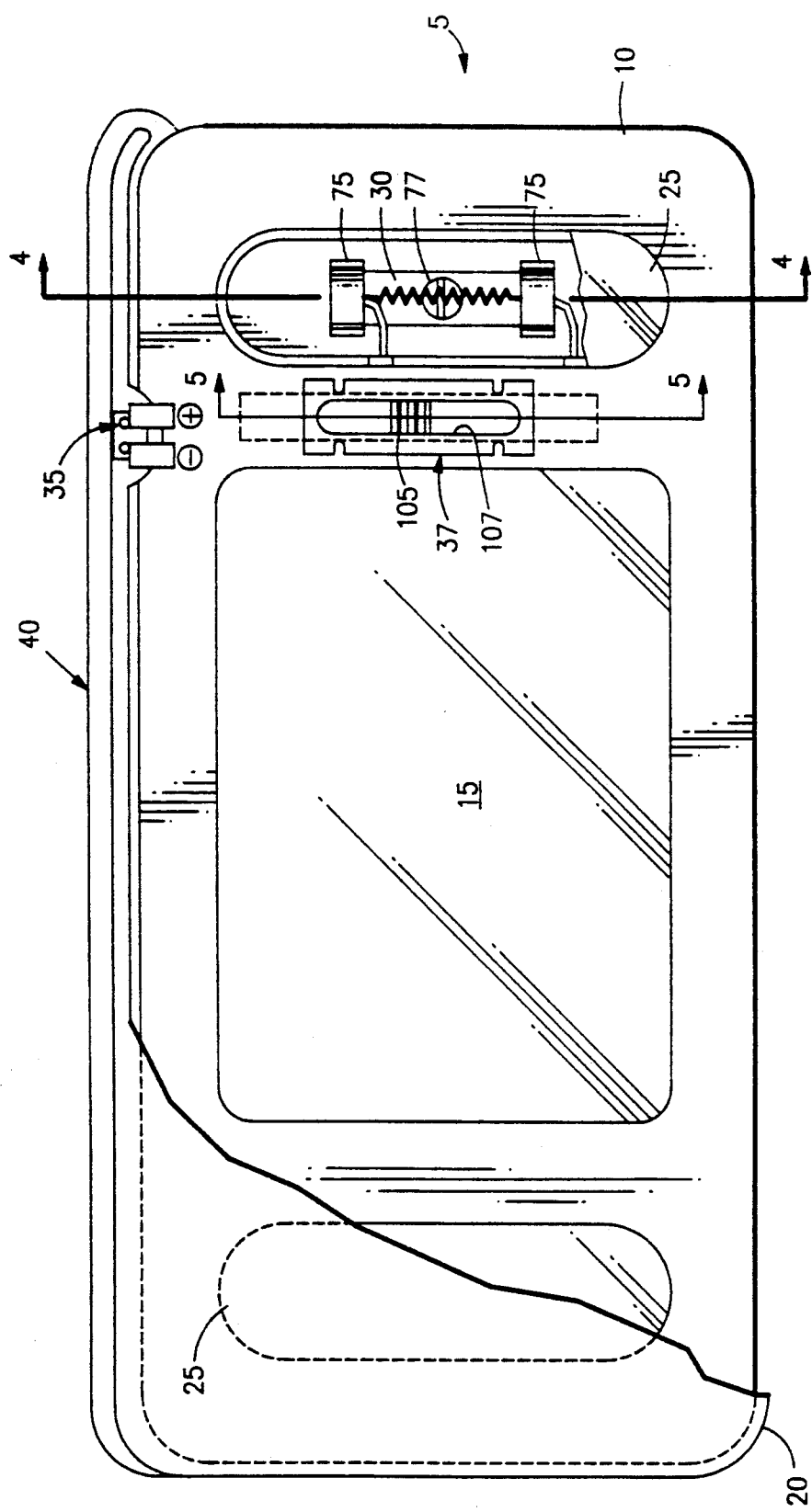
FIG. 1 is a plan view of the lighted vanity mirror module of the present invention having portions thereof broken away to disclose details of construction of the module.

Referring to FIG. 1, the lighted vanity mirror module of the present invention is shown generally at 5, comprising a forward (upper) appearance bezel 10 on which vanity mirror 15 is mounted. The bezel supports a hinged cover 20 and a pair of translucent lenses 25 which cover electric lamps 30. The cover may actuate a main on/off switch 35 to energize the lamps automatically when the cover is opened. The entire module is mounted within a sun visor 40 of any suitable construction.

Figure 2:
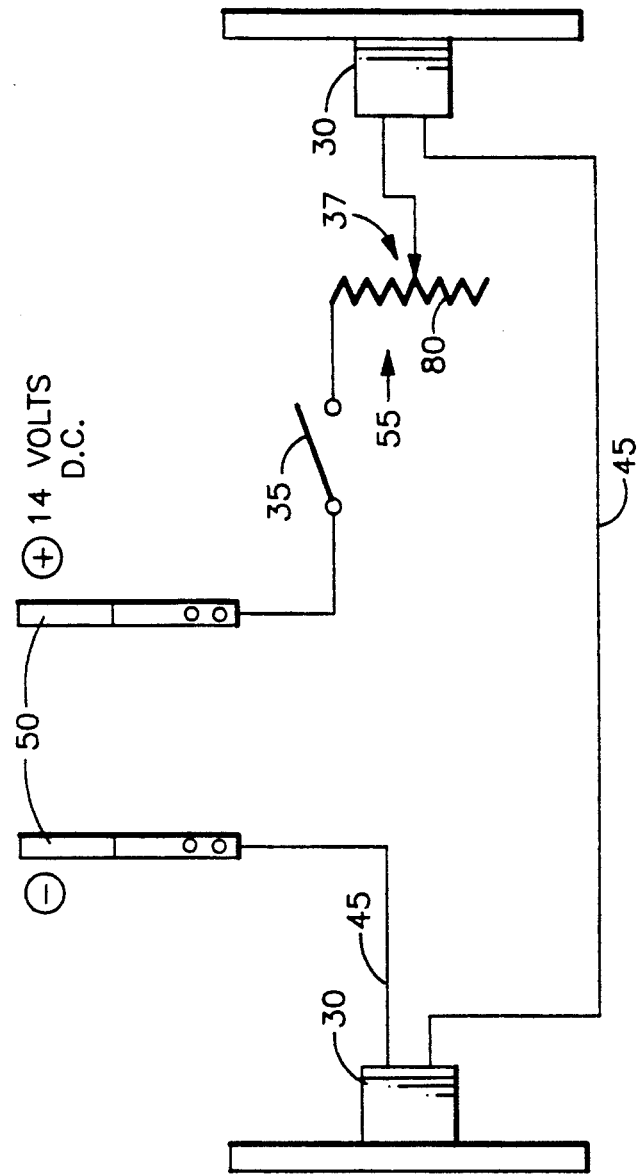
FIG. 2 is a schematic of the electrical circuit of the mirror module.

Referring to FIG. 2, lamps 30 may be connected by suitable circuitry 45 to the power supply of an automobile in which the module is employed, via terminals 50. Circuitry 45 may comprise a metallic stamping, wires or a combination thereof. A variable resistor 55 connected in series with the lamps allows current to the lamps to be controlled for the adjustable dimming thereof.

Figure 3:
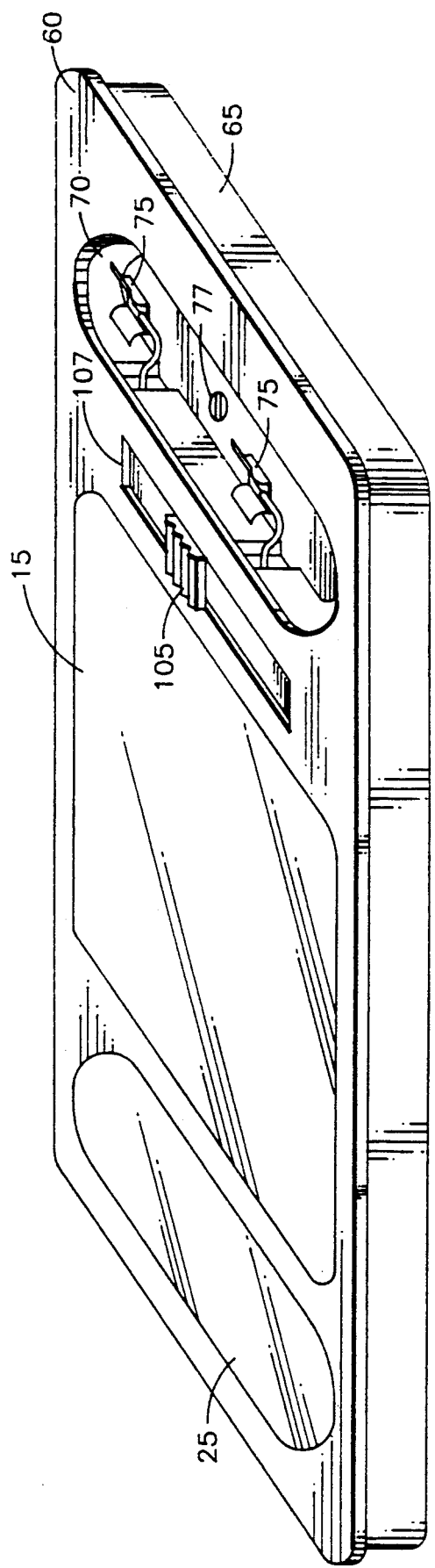
FIG. 3 is a perspective view of the module with the cover, one lens and a bulb removed for clarity.

Referring to FIG. 3, appearance bezel 10 comprises a generally flat panel 60 having a side skirt 65 integrally formed therewith for rigidity and is formed from any of various known plastics, such as polycarbonate, as by injection molding or the like. Wells 70 formed in the bezel at opposite ends thereof accommodate bulbs 30 by means of any of various known sockets (clips) 75 which are snap-fit in holes provided in the bottoms of the wells (see FIG. 4). The wells may also accommodate screws 77 or other known fasteners for mounting to sun visor 40. Circuitry 45 may comprise a metal stamping, wires, or a combination thereof, such stamping being conveniently attached to the underside of the bezel by heat staking or the like to form a firm, reliable electrical interconnection of the bulbs and dimmer control.

Referring to FIGS. 5-8, the variable resistor employed in dimmer control 55 comprises any one of various available wire wound resistors 80 which is snap or interference fit to a pair of clips 85 integrally molded into the underside of bezel 10. Typically, resistor 80 comprises a high resistance wire coil disposed on an insulative core of ceramic or the like. As best seen in FIG. 8, each of clips 85 comprises a bifurcated tang having a convergent slot 90 terminating in a circular aperture 95, formed in the end of the tang.

In addition to wire wound resistor 80, variable resistor 55 comprises a plastic contact carrier 100 movable over the surface of the wire wound resistor by sliding and constrained within the module by the wire wound resistor and the bezel. Contact carrier 100 includes a button 105 extending upwardly therefrom through slot 107 in the bezel for manipulation by a user. The carrier also includes a metal contact 110 snap-fit over the bottom of the carrier in surface-to-surface contact with terminal stamping 145 disposed on the underside of the bezel adjacent slot 107 and attached to the bezel by heat staking. The contact carrier is supported by hooks 115, molded integrally with the bezel on the underside thereof, for sliding contact along the upper surface of the wire wound resistor.

Referring to FIGS. 9 and 10, where greater weight and bulk associated with a full housing 116 of the type disclosed in the aforementioned U.S. application Ser. No. 07/357,652 can be tolerated, the wire wound resistor may be mounted in the back wall 117 of the housing in a clip formed integrally therewith. This clip comprises a slot 120 and an integral flange 125 underlying the slot, both the slot and flange being molded into the back wall. Wire wound resistor 80 is held within this clip by an interference fit with the edge of slot 120 and the surfaces of flange 125 and if necessary, by an auxiliary fastener (not shown) such as a rivet or the like. Contact carrier 130 including button 105 extending through slot 107 in the manner described hereinabove, includes an electrical contact 135 mounted on the bottom thereof as by heat staking. Contact 130 includes two spring legs 140, one of which slides on the free end thereof over wire wound resistor 80 and the other on a contact 145, heat staked to the back wall adjacent slot 120.

It will be readily appreciated that the lighted vanity mirror module of the present invention exhibits enhanced compactness and simplicity as well as an economy of construction and ease of assembly. The wire wound, variable resistor as a dimming control eliminates the necessity and expense of specialized resistors such as that shown in the aforementioned '637 patent. Mounting the wire wound resistor at the underside of the bezel on clips formed integrally therewith and employing the resistor along with the bezel to retain the sliding contact within the module, obviates the necessity and complexity of multiple, stationary contacts in a circuit stamping and an associated movable wiping contact. Use of the underside of the bezel to mount the remaining circuit components, i.e., the bulbs, contacts and collateral circuitry, completely eliminates the need for a housing for accommodation of these components. Where a housing is appropriate, the integral flange formed in the back wall of the housing provides a compact and economical mount for the wire wound resistor.

While certain embodiments of the present invention have been illustrated and described, various modifications thereof will readily suggest themselves to those skilled in the art. For example, while a wire wound resistor has been illustrated and described in the best mode of the present invention, various equivalent resistors will suggest themselves to those skilled in the art. Indeed, in the event that variable dimming is not required, dimmer 55 may be replaced by a simple on/off switch which may be mounted to the underside of the bezel in the same manner as dimmer 55 is mounted. Likewise, while specific geometric configurations of the bulbs, bulb sockets, clips, contacts, and contact carriers have been illustrated and described, it will be readily apparent that various other configurations of these components are equally well suited for use in the present invention. Accordingly, it is intended by the following claims to cover these and any other modifications as may fall within the true spirit and scope of the present invention.

Having thus described the invention, what is claimed is:

1. In a vanity mirror module for assembly to an automobile sun visor, said module comprising a bezel attachable on one surface thereof to an upper surface of said visor, said bezel comprising a generally flat panel, a mirror fixed to said bezel, and at least one opening for receiving at least one electric lamp for illuminating an object to be observed in said mirror; said lamp being powered by an electric circuit disposed between said bezel and said visor, and means to effect the controlled dimming of said lamp, the improvement wherein:
   said dimming means comprises an adjustable wire wound resistor disposed between said bezel and said visor; and
   said electric circuit includes a contact, said wire wound resistor being electrically connected to said lamp by said contact, said contact being movable over the surface of said wire wound resistor, said contact being disposed inwardly of said bezel and constrained by said wire wound resistor and said bezel.

2. The vanity mirror module of claim 1, wherein:
   said bezel includes a slot therein, and a button on which said contact is mounted, said button extending though said slot for manipulating said contact, said bezel further comprising a side skirt integrally formed therewith for rigidity.

3. The vanity mirror module of claim 2 further comprising:
   a rear wall substantially parallel to said bezel, said rear wall being mounted to said visor; and
   said resistor being attached to said rear wall.

4. The mirror module of claim 3 characterized by:
   said rear wall, at a forward surface thereof being provided with an integral clip;
   said wire wound resistor being fixed to said rear wall by a snap-fit engagement with said clip.

5. The mirror module of claim 4 wherein:
   said integral clip comprises a posterior slot formed in said rear wall, and a flange underlying said posterior slot,
   said flange supports said wire wound resistor on said rear wall and said posterior slot provides access to said wire wound resistor by said contact.

6. The vanity mirror module of claim 1 wherein said wire wound resistor is mounted to said bezel by an interference fit therewith.

7. The vanity mirror module of claim 6 characterized by said bezel, at an inner surface thereof, including at least one clip, said variable resistor comprising an elongate wire wound resistor, said wire wound resistor being fixed to said bezel by a snap-fit engagement with said clip.

8. The vanity mirror module of claim 7 characterized by said clip being formed integrally with said bezel, and comprising an inwardly projecting, bifurcated tang.

9. The mirror module of claim 1 wherein said bezel includes an integral well underlying said opening therein for receiving said at least one electric lamp.

10. In a vanity mirror module for assembly to an automobile sun visor, said module including a bezel attachable on one side to an upper surface of said visor, said bezel having a mirror fixed thereto, and at least one well for receiving at least one electric lamp for illuminating an object to be observed in said mirror; said electric circuit including electric conductors, said electric circuit being disposed between said bezel and said visor, and a dimmer means connected to said lamps for controlling the energization and therefore, the intensity thereof, the improvement comprising:
   said dimmer means comprising a wire wound resistor having a movable contact retained to said bezel by said wire wound resistor and slidable over a surface thereof to vary the resistance associated therewith;
   first fastening means disposed on said bezel for mounting said electric lamp on said bezel, said first fastening means comprising an electrically conductive clip attached to said rear cavity wall, and supporting said lamp by a snap-fit engagement therewith, said clip also comprising an electrical connection of said lamp in said circuit;
   second fastening means fastened to said bezel and disposed between said bezel and said sun visor for mounting said control means on said bezel,
   said electric conductors being mounted on said bezel, between said bezel and said sun visor;
   whereby said bezel supports said entire electric circuit of said mirror module, thereby obviating the need for a housing for containment of said circuit.

11. The mirror module of claim 10 wherein said second fastening means comprises an electrically insulative clip formed integrally with said bezel and disposed between said bezel and said rear wall, said wire sound resistor being snap-fit within said insulative clip.

12. The mirror module of claim 11 characterized by said clip comprising an inwardly projecting, bifurcated tang.

13. The mirror module of claim 10 characterized by said electric conductors comprising at least one metal stamping.

* * * * *

UNITED STATES PATENT AND TRADEMARK OFFICE
CERTIFICATE OF CORRECTION

PATENT NO. : 5,278,736
DATED : January 11, 1994
INVENTOR(S) : Monte L. Falcoff, et al.

It is certified that error appears in the above-indentified patent and that said Letters Patent is hereby corrected as shown below:

Column 6, line 18: after "said" should be --electric lamp being in electrical connection with and powered by an--

Signed and Sealed this

Twenty-fourth Day of May, 1994

Attest:

BRUCE LEHMAN

*Attesting Officer*  *Commissioner of Patents and Trademarks*